United States Patent
Anctil et al.

(10) Patent No.: US 11,546,382 B2
(45) Date of Patent: Jan. 3, 2023

(54) SYSTEMS AND METHODS FOR CLOUD-BASED FEDERATED RECORDS RETENTION COMPLIANCE ORCHESTRATION, VALIDATION AND ENFORCEMENT

(71) Applicant: OPEN TEXT SA ULC, Halifax (CA)

(72) Inventors: Peter Joseph Anctil, Long Beach, CA (US); David Humby, Richmond (CA); Alexander Gerasimov, Kanata (CA)

(73) Assignee: OPEN TEXT SA ULC, Halifax (CA)

( * ) Notice: Subject to any disclaimer, the term of this patent is extended or adjusted under 35 U.S.C. 154(b) by 76 days.

(21) Appl. No.: 16/923,824

(22) Filed: Jul. 8, 2020

(65) Prior Publication Data

US 2021/0014282 A1 Jan. 14, 2021

Related U.S. Application Data

(60) Provisional application No. 62/871,330, filed on Jul. 8, 2019.

(51) Int. Cl.
*H04L 9/40* (2022.01)
*H04L 67/1095* (2022.01)
*G06F 16/93* (2019.01)
*G06F 21/62* (2013.01)

(52) U.S. Cl.
CPC ........ *H04L 63/205* (2013.01); *G06F 21/6245* (2013.01); *H04L 67/1095* (2013.01); *G06F 16/93* (2019.01)

(58) Field of Classification Search
None
See application file for complete search history.

(56) References Cited

U.S. PATENT DOCUMENTS

| | | | |
|---|---|---|---|
| 2011/0047132 A1* | 2/2011 | Kilday | G06Q 10/10 707/694 |
| 2011/0093471 A1* | 4/2011 | Brockway | G06F 21/10 707/E17.083 |
| 2011/0153578 A1* | 6/2011 | Pogodin | G06F 16/258 707/694 |

(Continued)

*Primary Examiner* — Kevin T Bates
*Assistant Examiner* — Dae Kim
(74) *Attorney, Agent, or Firm* — Sprinkle IP Law Group

(57) ABSTRACT

Through a cloud-based centralized user interface, a federated compliance system presents a policy of interest and representations of disparate systems that match the policy of interest to a user. The disparate systems, which operate in a distributed network computing environment, can include cloud-based repositories and off-cloud repositories. The federated compliance system can pull the cloud-based repositories through a cloud orchestrator and the off-cloud repositories through an off-cloud orchestrator over a secure tunnel. The federated compliance system utilizes user-provided information on the policy of interest to determine various categories of attributes from different repository schemas employed by the disparate systems. A federated retention policy mapper, implemented as a compliance service, maps the attributes to a common schema, creates a federated retention policy, and stores it in a federated space in the distributed network computing environment. A policy change can be automatically propagated across the disparate systems using the federated retention policy.

17 Claims, 11 Drawing Sheets

(56) References Cited

U.S. PATENT DOCUMENTS

| | | | | |
|---|---|---|---|---|
| 2011/0153579 A1* | 6/2011 | Paknad | ................ | G06F 16/258 |
| | | | | 707/694 |
| 2012/0136904 A1* | 5/2012 | Venkata Naga Ravi | ................... | |
| | | | | G06F 16/21 |
| | | | | 707/803 |
| 2013/0304735 A1* | 11/2013 | Fineberg | ............... | G06F 16/256 |
| | | | | 707/736 |
| 2014/0019426 A1* | 1/2014 | Palmer | ................ | G06F 16/256 |
| | | | | 707/694 |
| 2015/0370809 A1* | 12/2015 | Humby | ................ | G06F 16/125 |
| | | | | 707/694 |
| 2017/0199989 A1* | 7/2017 | Lilko | ..................... | G06F 21/10 |
| 2018/0349487 A1* | 12/2018 | Garg | .................... | G06F 16/289 |

* cited by examiner

FIG. 4A

Admin Console

ACCOUNTABILITY
Jobs
Audits

USER AND SYSTEM MANAGEMENT
Roles & Permissions
Systems

MAPPING ATTRIBUTES TOOLKIT
EIM PLATFORM - AMERICAS
EIM PLATFORM - ASIA-PAC
EIM PLATFORM - EMEA
CMS
ECM

ECM
Drag and drop to map source system field names to Federated Compliance things.
⊕ Custom field name

Federated Compliance
Field names from target system

- created_date [ extended_immutability_rule × ]
- created_reason [ creation_justification × ]
- disabled_date
- disposition_action_code
- event_rule
- fixed_date
- name
- originated datescope_notes
- retention_days
- retention_months
- retention_years

ECM
Field names from source system

- create_date
- DCTMattribute2
- date_created_reason
- description
- disposition_strategy
- enabled
- extended_immutability_rule
- name
- Phase.cutoff_day
- Phase.cutoff_month
- Phase.cutoff_period
- Phase.duration_days
- Phase.duration_months
- Phase.duration_years
- retention_strategy_name

FIG. 4B

| Admin Console | |
|---|---|
| ACCOUNTABILITY | EIM PLATFORM - AMERICAS |
| Jobs | Drag and drop to map source system field names to Federated Compliance things. |
| Audits | ⊕ Custom field name |
| USER AND SYSTEM MANAGEMENT | |
| Roles & Permissions | |
| Systems | |
| MAPPING ATTRIBUTES TOOLKIT | |
| EIM PLATFORM - AMERICAS | |
| EIM PLATFORM - ASIA-PAC | |
| EIM PLATFORM - EMEA | |
| CMS | |
| ECM | |

| Federated Compliance<br>Field names from target system | | | EIM PLATFORM - AMERICAS<br>Field names from source system |
|---|---|---|---|
| created_date<br>[RSI.CreateDate ×] | | | RSI.Disposition.Strategy |
| created_reason<br>[RSI.Description ×] [RSI.CreateReason ×] | | | RSI.CreateDate |
| | | | RSI.CreateReason |
| disabled_date<br>[RSI.DiscontDate ×] | | | RSI.Cutoff.Day |
| disposition_action_code<br>[RSIEventSched.Disposition ×] | | | RSI.Description |
| event_rule | | | RSI.Disposition.Strategy |
| | | | RSI.DiscontDate |
| fixed_date<br>[RSI.Cutoff.Day ×] | | | RSIEventSched.EventType |
| name<br>[RSI ×] | | | RSIEventSched.DateToUse |
| originated_datescope_notes<br>[RSIEventSched.EventNotes ×] | | | RSIEventNotes |
| retention_days<br>[RSIEventSched.RetDays ×] | | | RSIEventSched.RetIntervals |
| retention_months<br>[RSIEventSched.RetMonths ×] | | | RSIEventSched.RetDays |
| | | | RSIEventSched.RetMonths |
| | | | RSIEventSched.RetYears |
| retention_years | | | RSIEventSched.Disposition |

| Dashboard | Retentions | Holds | Compliance | Dispositions | Destructions | Tasks | Audit | Permissions | Roles | Systems |

Retentions

+

| Enabled | Published | Policy Title | Description | IMS | ECM | ARCHIVE | Created |
|---|---|---|---|---|---|---|---|
| ☐ | ⊙⋯ | Retention Policy 1 | Test retention policy | 2 | 2 | 0 | 2019-12-18 4:11 PM |
| ☐ | ⊙> | Retention Policy 2 | Test retention policy | 0 | 2 | 0 | 2019-12-17 12:37 PM |
| ☐ | ⊙− | Retention Policy 3 | Test retention policy | 1 | 1 | 1 | 2019-12-19 2:34 PM |
| ☐ | ⊙> | Retention Policy 4 | Test retention policy | 1 | 0 | 1 | 2019-12-19 2:34 PM |
| ☐ | | Retention Policy 5 | Test retention policy | 0 | 0 | 0 | 2019-12-19 2:34 PM |
| ☐ | ⊙⋯ | Retention Policy 6 | Test retention policy | 3 | 0 | 0 | 2019-12-19 2:34 PM |
| ☐ | ⊙> | Retention Policy 7 | Test retention policy | 2 | 1 | 1 | 2019-12-19 2:34 PM |
| ☐ | | Retention Policy 8 | Test retention policy | 0 | 0 | 0 | 2019-12-19 2:34 PM |
| ☐ | ⊙− | Retention Policy 9 | Test retention policy | 1 | 0 | 0 | 2019-12-19 2:34 PM |
| ☐ | ⊙> | Retention Policy 10 | Test retention policy | 2 | 1 | 2 | 2019-12-19 2:34 PM |
| ☐ | | Retention Policy 11 | Test retention policy | 0 | 0 | 0 | 2019-12-17 11:41 AM |
| ☐ | | Retention Policy 12 | Test retention policy | 0 | 0 | 0 | 2019-12-17 11:42 AM |
| ☐ | ⊙> | Retention Policy 13 | Test retention policy | 2 | 0 | 0 | 2019-12-17 12:22 PM |
| ☐ | | Retention Policy 14 | Test retention policy | 0 | 0 | 0 | 2019-12-17 12:57 PM |

14 items

FIG. 5B

| Dashboard | Retentions | Holds | Compliance | Dispositions | Destructions | Tasks | Audit | Permissions | Roles | Systems |
|---|---|---|---|---|---|---|---|---|---|---|

Retentions > Retention Policy 2

↓  +

⊙ Retention Policy 2 ⌄

| ☐ Published | System Type | Disposition Action | Phases | Assigned Systems |
|---|---|---|---|---|
| ☐ ⋯ | CMS | Destroy | Review Phase | 2 |
| ☐ ⌄ | ECM | Retain Permanently | Phase 1, Phase 2 | 2 |

2 items

FIG. 5C

SYSTEMS AND METHODS FOR CLOUD-BASED FEDERATED RECORDS RETENTION COMPLIANCE ORCHESTRATION, VALIDATION AND ENFORCEMENT

CROSS-REFERENCE TO RELATED APPLICATION(S)

This application claims a benefit of priority under 35 U.S.C. § 119(e) from U.S. Provisional Application No. 62/871,330, filed Jul. 8, 2019, entitled "SYSTEMS AND METHODS FOR CLOUD-BASED FEDERATED RECORDS RETENTION COMPLIANCE ORCHESTRATION, VALIDATION AND ENFORCEMENT," which is fully incorporated by reference herein for all purposes.

TECHNICAL FIELD

This disclosure relates generally to records management. More particularly, this disclosure relates to systems, methods, and computer program products for cloud-based federated compliance orchestration, validation, and enforcement of records retention polices across disparate repositories.

BACKGROUND OF THE RELATED ART

Information technology and the Internet have made it easier to collect personal data, sell personal data for profit, or exploit personal data to stalk a person, harass a person, or steal the identity of a person. Accordingly, data protection laws, which concern the security of the electronic transmission of personal data, evolve over time to govern how personal data should be handled. Records management technologies used by companies, organizations, enterprises, and the like (which are hereinafter collectively referred to as "entities") must follow suit as non-compliant entities can face very strict fines.

For example, to comply with the European (EU) General Data Protection Regulation (GDPR), which went into effect in 2018, many entities, particularly those that handle personal data of European individuals, must make operational changes and/or have security built into their products and processes. This is because the EU GDPR applies to any entity collecting and/or processing EU citizen's personal data regardless of where the entity's physical offices are located. This means that a non-EU company must also comply with the EU GDPR if that non-EU company handles the personal data of EU individuals, even if the non-EU company does not have any physical office in any EU country. In the EU GDPR, "personal data" broadly covers "any information relating to an identified or identifiable natural person ('data subject'); an identifiable natural person is one who can be identified, directly or indirectly, in particular by reference to an identifier such as a name, an identification number, location data, an online identifier or to one or more factors specific to the physical, physiological, genetic, mental, economic, cultural or social identity of that natural person."

Entities that handle the personal data of EU individuals are referred to as "controllers" (or data controllers) and "processors" (or data processors) in the EU GDPR. A "controller" is defined in the EU GDPR as "the natural or legal person, public authority, agency or other body which, alone or jointly with others, determines the purposes and means of the processing of personal data" and a "processor" is defined in the EU GDPR as "a natural or legal person, public authority, agency or other body which processes personal data on behalf of the controller."

An example of a data controller would be a company that specifies how and why personal data is processed. Another company that conducts the actual processing of the data would be the data processor. The controller is responsible for ensuring their processor abides by the EU GDPR and the processor must follow the regulations and maintain records of their processing activities. With the EU GDPR, if a processor is involved in a data breach, it is far more liable than under the previous data protection law. Thus, compliance with the EU GDPR is a must for processors and non-compliance has severe real world consequences.

In the U.S., the protection of personal data of U.S. residents is regulated by laws enacted on both the national and the state level. Here, the term "personal data" is also known as personal information, personally identifying information (PII), or sensitive personal information (SPI) and generally refers to "any information relating to an identifiable person." PII is defined by the National Institute of Standards and Technology (NIST), Special Publication 800-122, as "any information about an individual maintained by an agency, including (1) any information that can be used to distinguish or trace an individual's identity, such as name, social security number, date and place of birth, mother's maiden name, or biometric records; and (2) any other information that is linked or linkable to an individual, such as medical, educational, financial, and employment information." So, for example, a user's Internet Protocol (IP) address is not classed as PII on its own, but can be classified as linked PII. However, in the EU GDPR, the IP address of an Internet subscriber may be classified as personal data.

Regulations of PII apply to many different industries in the U.S. For example, Health Insurance Portability and Accountability Act (HIPPA) is a 1996 Federal law that restricts access to individuals' private medical information. HIPAA requires that business associates (BA) and covered entities (CE) retain certain information (e.g., a written or electronic record of a designation of an organization as a CE or BA, accounting of disclosures of protected health information (PHI), etc.) for at least six years from creation date or last effective date, whichever is later. This is referred to as a "retention period." At the state level, the required retention period of medical records can be even longer and/or more varied.

For global entities, they will also need to comply with data protection and/or privacy laws and regulations enacted by individual countries. For instance, the Personal Information Protection and Electronic Documents Act (PIPEDA) is a 2000 Canadian law that governs private sector organizations and corporations alike in how they collect, use, and disclose personal information in electronic commerce.

For many entities, it can be important to ensure that their repositories and processes are in compliance with the many legal requirements of various data protection laws and regulations across the globe, as exemplified above. However, as entities grow and data protection laws evolve, existing records retention solutions have become inadequate. For instance, for a processor to scale up to service (e.g., orchestrate, validate, and enforce records retention compliance) one hundred billion objects per a controller is technically unattainable based on current architectures. Consequently, there is room for innovations and improvements in records retention compliance orchestration, validation, and enforcement.

SUMMARY OF THE DISCLOSURE

Embodiments disclosed herein can address the aforementioned drawbacks and provide additional technical solutions and benefits. An object of the invention is to provide a scalable, efficient, and cost-effective solution for orchestrating records and compliance across multiple repositories. This solution represents a fundamental shift from prior records management approaches in that it includes Software as a Service (SaaS) operations with on-premises (also known as on-premise, and abbreviated as "on-prem") components to access on-prem data repositories where sensitive and/or high risk data such as PII is stored, while compliance repositories can be external and centrally managed through an administrative interface hosted in a cloud computing environment.

To realize this solution, embodiments disclosed herein provide systems, methods, and computer program products for cloud-based federated compliance orchestration, validation, and enforcement of records retention polices across disparate repositories. Such repositories can be characterized as being disparate at least because they have different metadata, schemas, and/or structures for how they manage records retention. While interconnecting multiple types of repositories of systems can be technically complex in and by itself, an additional challenge here is to provide metadata mapping between/among the disparate repositories so it becomes a functional SaaS solution over time without overly burdening administrative users.

In some embodiments, a federated compliance system having a federated retention policy mapper and a cloud-based centralized user interface on a user device is adapted for presenting through the cloud-based centralized user interface, a policy of interest and representations of disparate systems that match the policy of interest. The disparate systems can include cloud based repositories and off-cloud repositories that operate in a distributed network computing environment and that employ different repository schemas.

The federated compliance system is further adapted for prompting, through the cloud-based centralized user interface, a user to provide information on the policy of interest. The user-provided information on the policy of interest is utilized in determining attributes from the different repository schemas employed by the disparate systems in the distributed network computing environment. Using a data model, the federated retention policy mapper maps the attributes from the different repository schemas employed by the disparate systems to a common schema. This mapping produces a federated retention policy having the common schema. The federated retention policy is then stored in a federated space or common storage in the distributed network computing environment.

In some embodiments, the federated compliance system further comprises a cloud orchestrator and an off-cloud orchestrator. The federated retention policy can be synced with the plurality of cloud-based repositories through the cloud orchestrator and also synced with the plurality of off-cloud repositories through the off-cloud orchestrator, for instance, via a secure tunnel provided by a tunnel server.

In some embodiments, the federated retention policy mapper can be implemented as a compliance service. The compliance server can be one of a plurality of microservices provided by a computing platform particularly suitable for federated compliance and control of content. In some embodiments, the compliance service is adapted for communicating the federated retention policy directly to a retention policy service which, in turn, stores the federated retention policy in the federated space.

The attributes required by the disparate systems can be categorized as those that are common in the disparate systems to which the policy of interest is applicable, those that are common in a repository type; those that are common across a single repository type; and those that are specific to a single repository.

The federated retention policy thus created can be used to centrally automatically propagate changes across disparate systems. For instance, the federated compliance system may receive, through the cloud-based centralized user interface, an indication of a change to the policy of interest. The federated retention policy can be modified to reflect the change and the modified federated retention policy can be synced with the disparate systems by, for instance, mapping a data field in the common schema with a mapped data field in each repository schema.

The federated retention policy thus created can also be used to centrally automatically associate a new policy with disparate systems. When a new policy is created, a set of attributes can be determined from the new policy and mapped to the federated retention policy, which is already associated with the disparate systems.

In some embodiments, the federated compliance system is adapted for supporting single-phase and multi-phase policies. For instance, a determination can be made as to whether a repository of the disparate systems requires a data field for indicating a phase of a multi-phase policy. If such a data field is not required by the repository, the repository is mapped to a default value (e.g., single phase). Otherwise, it is mapped to a corresponding data field in the common schema for the federated retention policy.

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. The features illustrated in the drawings are not necessarily drawn to scale.

FIGS. 4A-4B show views of an administrative console of a cloud-based federated compliance application, according to some embodiments.

FIGS. 5A-5D show views of a dashboard for cloud-based federated compliance and control of content across disparate repositories, according to some embodiments.

DETAILED DESCRIPTION

Figure 1:
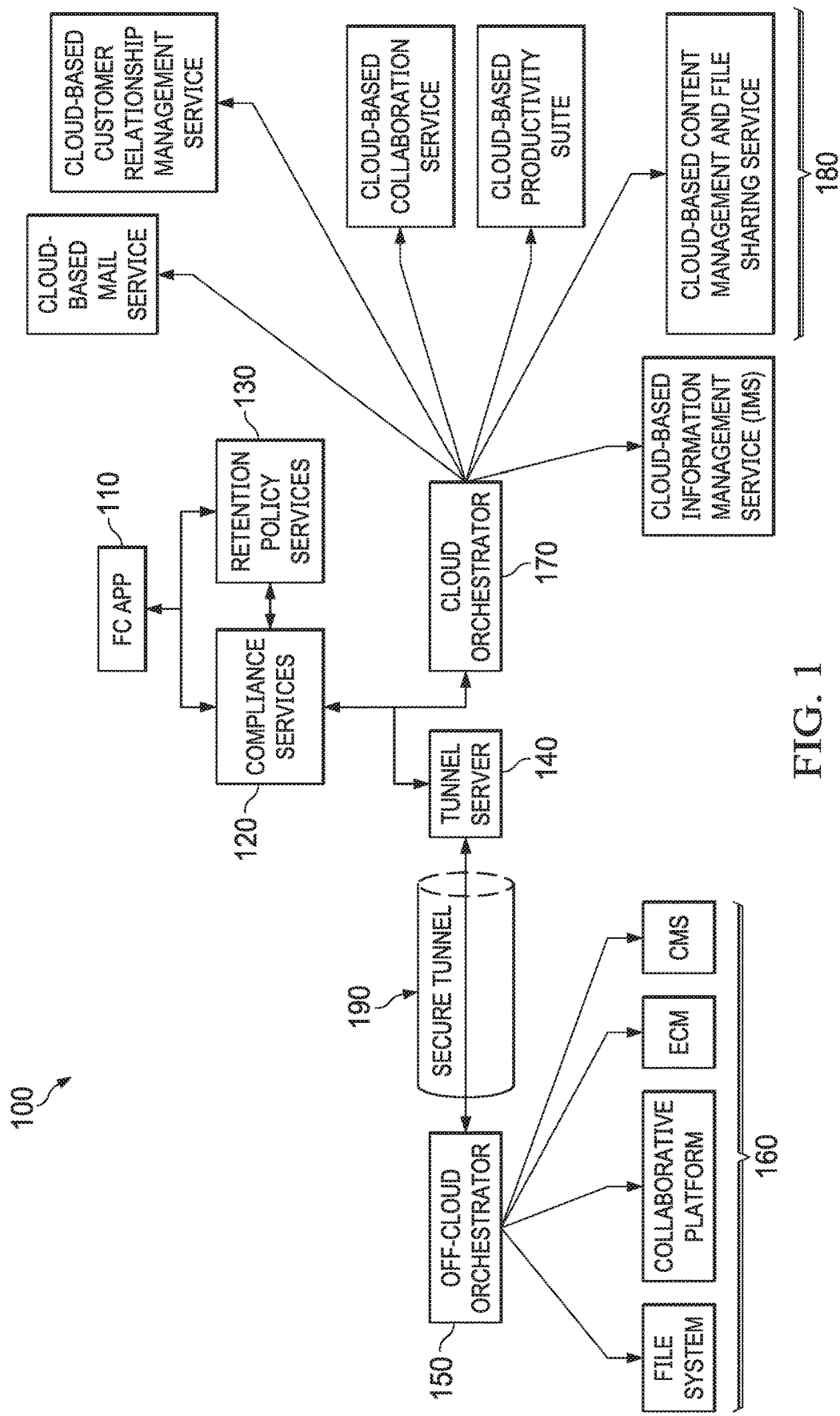
FIG. 1 diagrammatically illustrates, by example, a logical architecture for operating a federated compliance application in a distributed network computing environment for centralized records management across disparate repositories, according to some embodiments.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

In this disclosure, a repository refers to a database or storage of electronic data with an associated set of data management, search, and access methods, including the ability to store and modify content in addition to searching and retrieving. The repository can function as a storage engine for a larger, enterprise-class application such as an enterprise content management (ECM) system, a content management system (CMS), or a document management system (DMS). Such a system can add a user interface (UI) on top of the repository's application programming interface (API). OPENTEXT CONTENT SUITE and DOCUMENTUM, available from OpenText Corporation, headquartered in Waterloo, Ontario, Canada, are examples of ECM systems. MICROSOFT SHAREPOINT (SHAREPOINT), available from Microsoft Corporation, headquartered in Redmond, Wash., U.S.A., is an example of a DMS. OPENTEXT CONTENT SUITE (CONTENT SUITE), DOCUMENTUM, and OPENTEXT are the property of OpenText Corporation. SHAREPOINT and MICROSOFT are the property of Microsoft Corporation. All trade marks, service marks, certification marks, and collective marks cited herein are the property of their respective owners in the United States and/or other countries. Each trade mark, service mark, certification mark, or collective mark is used herein to identify an article or product, service, or organization.

A repository can provide many functions, including add/edit/delete content, hierarchy and sort order management, query/search, versioning, access control, import/export, locking, life-cycle management, and retention and holding/records management (RM). RM generally relates to the management of information in an entity throughout the information's life cycle, from the time of creation or inscription to its eventual disposition. This includes identifying, classifying, storing, securing, retrieving, tracking and destroying or permanently preserving records. RM is part of an entity's broader function of governance, risk management, and compliance and is primarily concerned with managing the evidence of that entity's activities as well as the reduction or mitigation of risk associated therewith.

As alluded to above, existing systems (e.g., DOCUMENTUM, CONTENT SUITE, SHAREPOINT, etc.) handle retention policies in a very diverse way. For instance, they may utilize very different schemas and apply retention policies differently, depending upon how the systems were built and what each system requires to function. As discussed above, an entity (e.g., a "processor" as defined in the EU GDPR) that processes data for its customers (e.g., "controllers" as defined in the EU GDPR) must abide by many data protection laws and regulations and ensure that their repositories and operations are in compliance. The disparate nature of how existing systems are structured to apply retention policies to data stored in the repositories presents many challenges in RM.

For example, an entity may store their data in multiple systems and these systems employ different database schemas to store data and require different sets of data fields to operate. A user tasked with RM for the entity (e.g., an administrator or a records manager) would have to manually create and/or import a retention policy for each of the multiple systems using a user interface (UI) of the respective system, configure the respective system through the respective UI to apply and/or enforce the respective retention policy according to the respective system's required data fields, and, when necessary, modify/edit/update the respective retention policy through the respective UI. This is a tedious, error-prone, slow, and highly inefficient RM process.

From a user perspective, what is needed is an RM application with a centralized UI where the aforementioned RM process can be customized once and applied to multiple systems programmatically automatically. FIG. 1 illustrates an example of architecture 100 with a federated compliance application (FC APP) 110 for centralized RM across disparate repositories 160, 180.

In the example of FIG. 1, architecture 100 includes an off-cloud orchestrator 150 having repository-specific connectors configured for communicating with disparate repositories 160 that operate in a private or secure network behind a firewall (e.g., a network that is owned and operated by a controller). Here, off-cloud orchestrator 150 is an example of an on-prem component of architecture 100.

As a non-limiting example, disparate repositories 160 can include a repository of the file system (FILE) type, a repository of the SHAREPOINT (SP) type, a repository of the DOCUMENTUM (DCTM) type, a repository of the CONTENT SUITE (OTCS) type, etc. In this example, architecture 100 further includes a cloud orchestrator 170 having repository-specific connectors configured for communicating with disparate repositories 180 that operate in a cloud computing environment. The non-limiting examples of disparate cloud-based repositories 180 shown in FIG. 1 are known to those skilled in the art and thus are not further described herein.

In some embodiments, FC APP 100 can be implemented as a SaaS application that is built and that operates on a hybrid platform for enterprise information management (EIM) with on-prem and managed hosted components. FC APP 100 can be delivered by the hybrid platform to client devices as a microservice and can benefit from common services, including common storage, common security, and common data models provided by the hybrid platform. OPENTEXT O12 is an example of a suitable hybrid platform.

Figure 6:
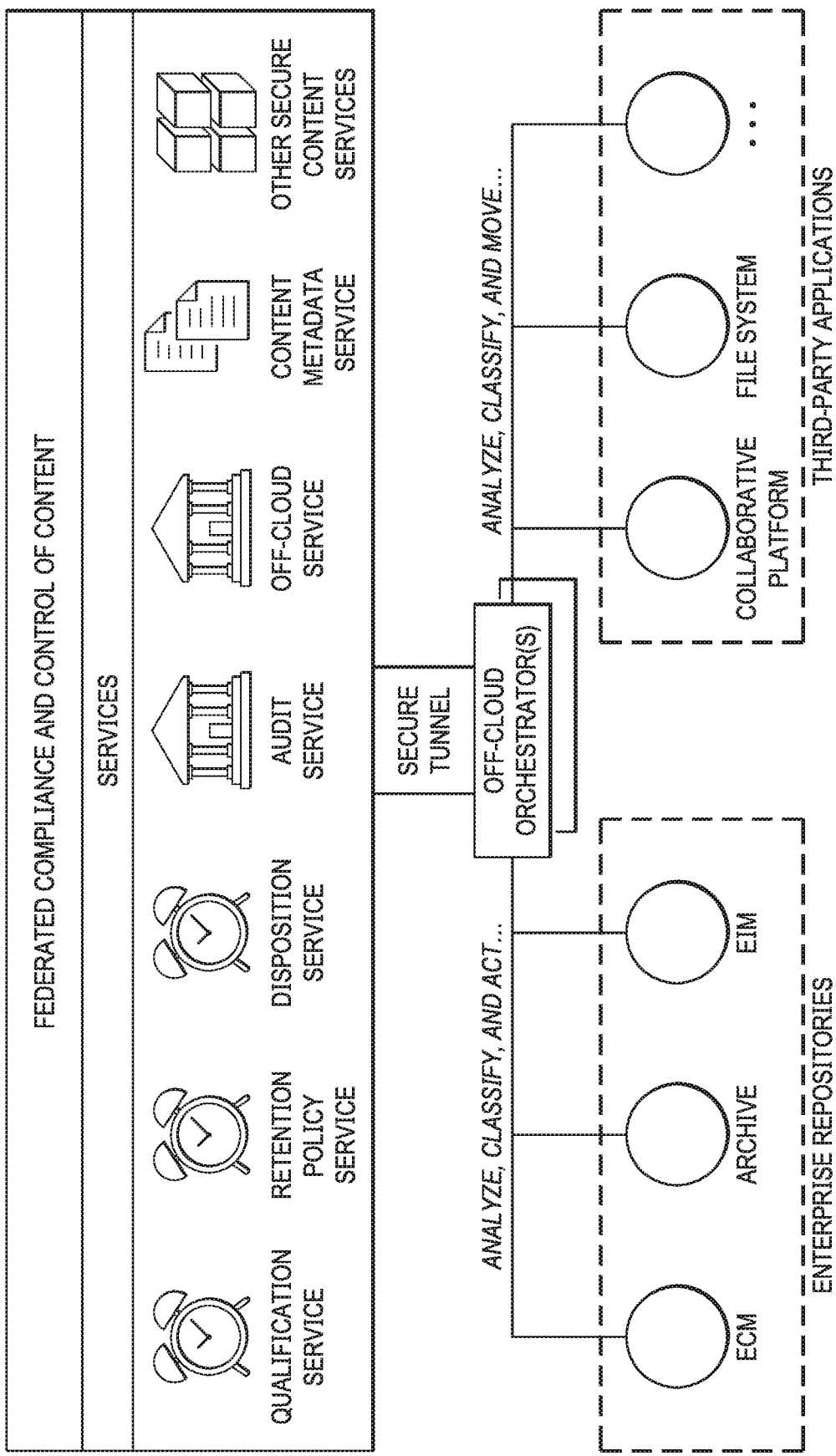
FIG. 6 diagrammatically illustrates, by example, a hybrid platform with microservices adapted for federated compliance and control of content across disparate repositories, according to some embodiments.

In the example of FIG. 1, architecture 100 further includes compliance services 120 and retention policy services 130. In some embodiments, compliance services 120 and retention policy services 130 can be implemented as microservices supported by the infrastructure of the hybrid platform described above. A non-limiting example of a hybrid platform is illustrated in FIG. 6.

As illustrated in FIG. 1, compliance services 120 and retention policy services 130 are communicatively connected to FC APP 100 and to each other. Additionally, compliance services 120 is communicatively connected to cloud orchestrator 170 and, through a secure tunnel 190 provided by a tunnel server 140, to off-cloud orchestrator 150. Features and operations of these components of architecture 100 are further described below.

In some embodiments, FC APP 100 provides a cloud-based centralized UI through which a user can be presented with a policy of interest and representations of multiple systems that match the policy of interest. The user can change the policy only once (e.g., change a duration of the retention period) through the UI and the change is automatically propagated to the multiple systems so that appropriate actions can be taken by the multiple systems. This is further described below.

In some embodiments, a federated compliance system implementing architecture 100 has the knowledge of data fields (which contain metadata, properties, or attributes) required by the multiple systems and the ability to map them across the multiple systems. In some embodiments, attributes required by the multiple systems can fall into four different categories.

Figure 2:
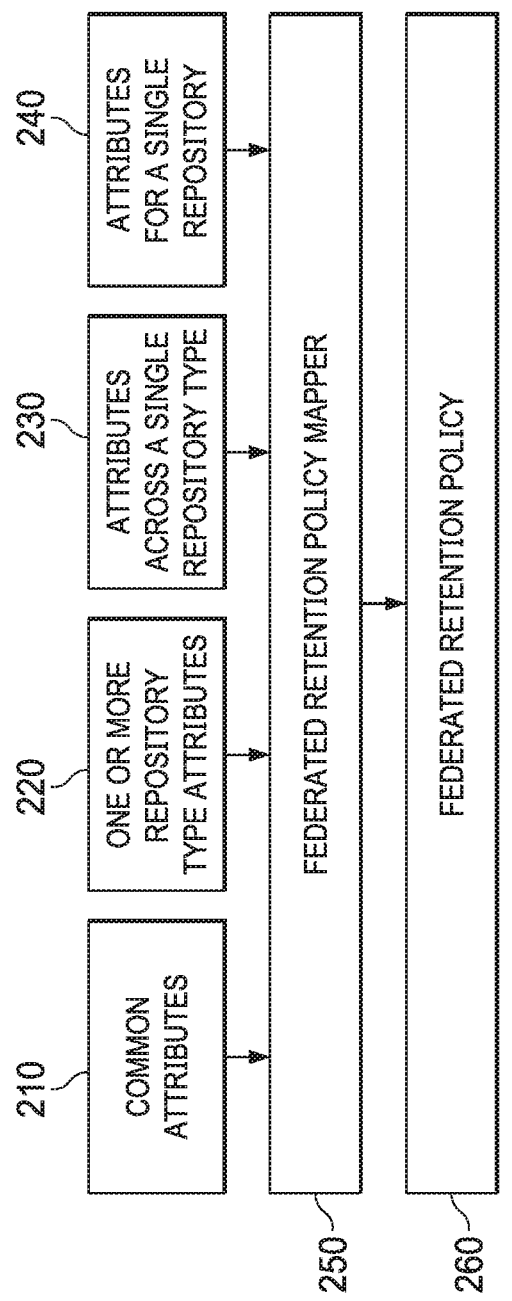
FIG. 2 diagrammatically illustrates, by example, a federated retention policy mapper adapted for mapping various categories of attributes to a federated retention policy, according to some embodiments.

FIG. 2 illustrates an example of how such attributes are categorized in architecture 100. In the example of FIG. 2, attributes 210 are common in the multiple systems to which the policy of interest is applicable; attributes 220 are common in one or more repository type; attributes 230 are common across a single repository type; and attributes 240 are unique or specific to a single repository (i.e., common within the single repository).

Figure 3:
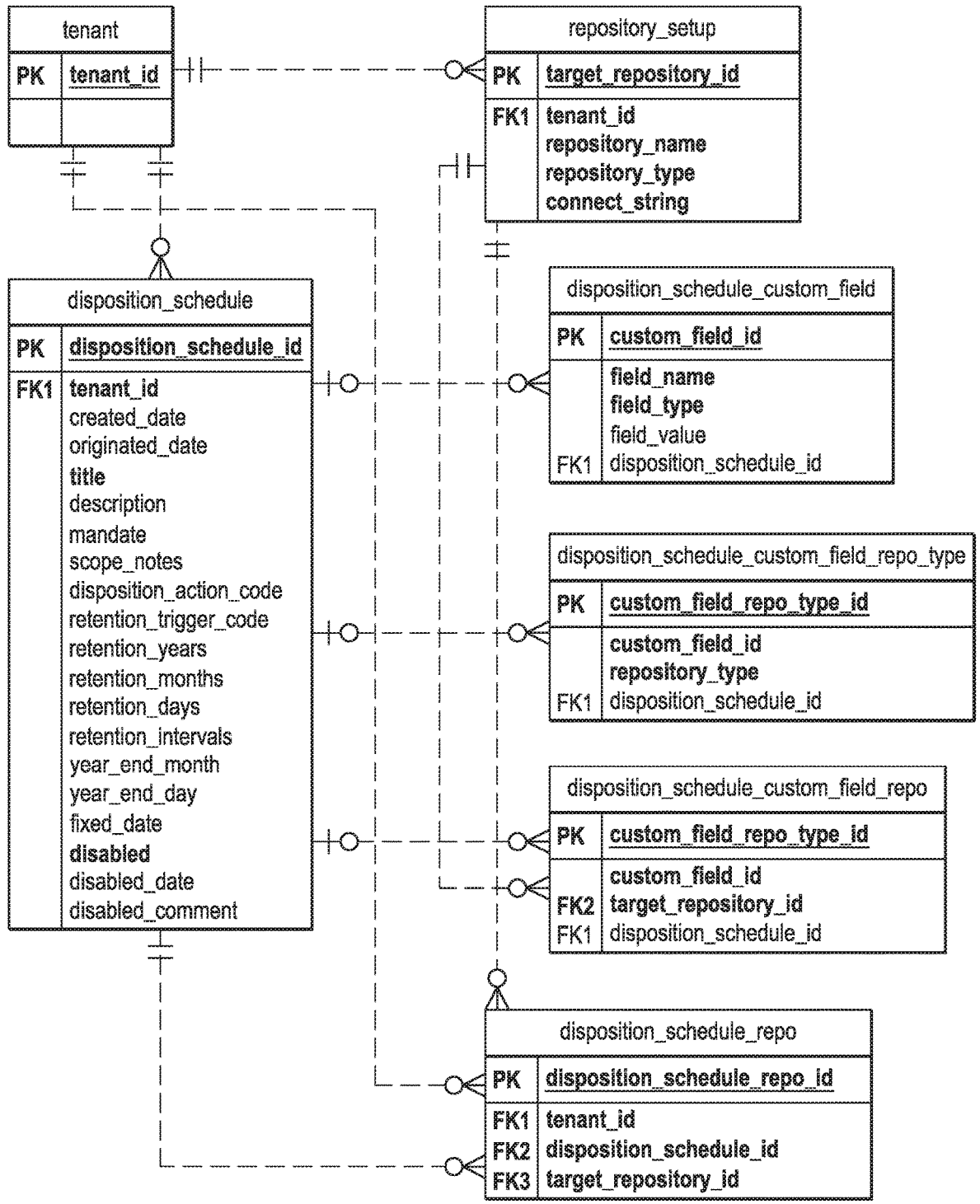
FIG. 3 shows a non-limiting example of a data model for mapping various categories of attributes from repository schemas employed by multiple disparate systems to a common schema, according to some embodiments.
Figure 5A:
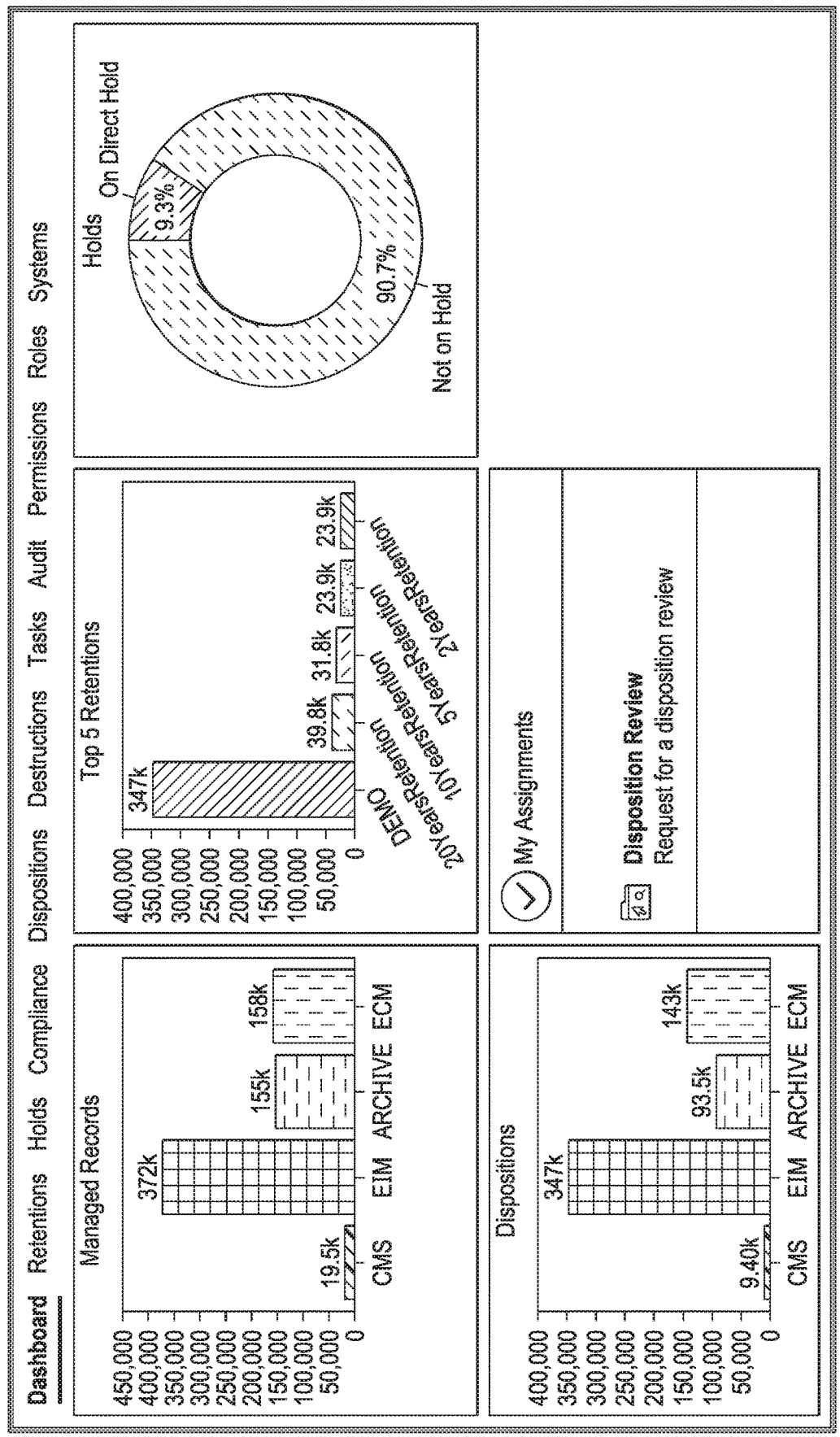
Figure 5D:
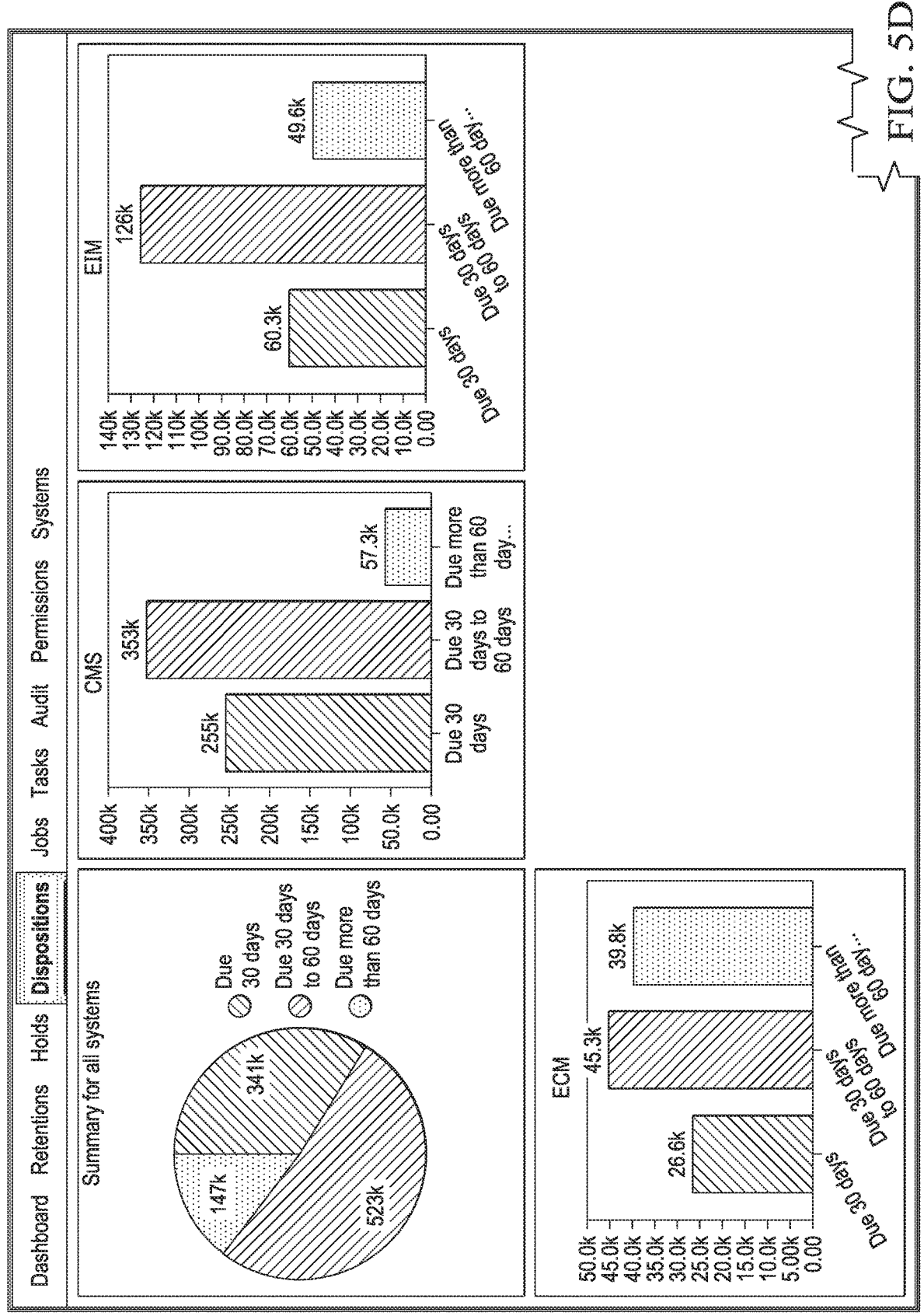

In some embodiments, a federated retention policy mapper 250 is operable to map the various attributes from the repository schemas employed by the multiple systems to a common schema or data model, an example of which is shown in FIG. 3. The common schema is utilized by a federated retention policy (FRP) 260 to describe all possible attributes across the repositories that are associated to the policy of interest.

In some embodiments, federated retention policy mapper 250 is implemented as part of compliance services 120 shown in FIG. 1. The mapping function provided by compliance services 120 can be utilized by FC APP 100 to figure out how to present to the user (through the UI) on what is common and what is not common for all policies, for some policies, for specific policies, etc.

When a client (e.g., a controller within the meaning of the EU GDPR) of the federated compliance system (which can be owned and operated by a processor within the meaning of the EU GDPR) creates a new policy, existing repositories can be associated to the new policy through FC APP 100. Through the UI provided by FC APP 100, an administrator or authorized user of the client can fill in information on what attributes would be common to all the existing repositories, common to some of the existing repositories, common to a repository type, common to a repository, etc. The federated compliance system utilizes that information and maps the attributes to their respective common names on the federated side (e.g., the FRP).

As discussed above, different systems have different sets of required data fields. If a repository does not have a data field that is required by other repository or repositories, it is not mapped. For example, some repositories support multi-phase policies and, therefore, may require a data field for indicating a phase of a multi-phase policy. Repositories that support single-phase policies do not have such a data field. Consequently, those repositories are not mapped to a FRP that requires such a data field. In this way, a mapped FRP can be associated with a set of disparate repositories.

In some embodiments, if a repository does not have any notion of a phase, it can be mapped to a default value (e.g., single phase). The default value can be stored locally. Such an implementation can be useful to drive storage locations, e.g., fast storage, medium speed storage, cheaper storage, online, near line, etc. That is, in addition to retention purposes (e.g., storing and/or culling records based on duration of storage), phases can be used for optimizing costs, speed, and/or locations in storing electronic records.

As discussed above, in addition to being located in disparate physical locations, the disparate repositories can be of different types, depending upon the type of EIM system (e.g., ECM, CMS, DMS, etc.) that employs them. In some embodiments, federated retention policy mapper 250 is operable to first map any data fields that are common (e.g., the duration of a retention period) to all the disparate repositories, then map any data fields that are common to one or more repository types, then map any data fields that are common across a single repository type, and, finally, map any data fields that are common in a single repository.

As a non-limiting example, for event-based retention or chronological retention, a repository needs to know what date to use on objects so that it can calculate the age of these objects. This date could be repository-specific. Thus, a repository, Repo A, may use Field A and another repository, Repo B, may use a different field, Field B, etc. Suppose Repo A and Repo B are of the same repository type which requires a duration field, the duration field would be repository-type specific, but not repository-specific. When a policy is associated with a particular repository, it is associated to that repository and not to the repository type of the repository. An administrator or authorized user can (e.g., through FC APP 100) specify that a repository-specific field must be used. The administrator or authorized user can also specify a data field that is common to all repository types, common across certain types of repositories, or common to a particular type of repositories. Each instance of a repository of a specific type of repository has a set of values that can be configured using FC APP 100.

In some embodiments, all the federated retention policies can follow a common model (i.e., a common schema), with additional attributes that are all named the same across all repository types. All the attributes that are common have been mapped from the attributes coming from the different repositories to the appropriate ones on the federated side through the common schema. If an attribute does not exist, it can be created (e.g., by federated retention policy mapper 250). That is, through FC APP 100, an administrator or authorized user can pull policies from disparate repositories of different types. In response, compliance services 120 can attempt to map attributes required by the disparate repositories to create a FRP. If a match cannot be found (e.g., for a repository-specific attribute or a repository-type-specific attribute), federated retention policy mapper 250 is operable to create one in the common schema and map it there for the different types of repositories.

Once mapped (e.g., by federated retention policy mapper 250 implemented as part of compliance services 120), the FRP (e.g., FRP 260) can be communicated to (e.g., through compliance services 120) to retention policy services 130. In turn, retention policy services 130 can store the FRP in a federated space (e.g., a common storage provided by the hybrid platform described above). When the FRP (as a newly mapped FRP or a newly updated FRP) is pushed down (e.g., through off-cloud orchestrator 150 or cloud orchestrator 170 shown in FIG. 1), it is pushed to only the mapped repositories for which the FRP is applicable.

In some embodiments, while the FRP is federally orchestrated, compute of the FRP is offloaded to the mapped repositories respectively. This compute offloading provides many technical benefits, including reducing the computational requirements of a federated compliance system implementing architecture 100, significantly increasing scalability to service millions of users, providing flexibility in servicing larger repositories with billions of objects as well as smaller repositories with millions of objects, facilitating easy and speedy implementation, and so on.

Previously, how disparate systems communicate with each other is highly complex to orchestrate, even if they employ the same type of repositories with matching attributes. This problem is compounded when trying to poll all of the content objects into a single instance of a repository type. This is because contents were created as objects and any attempt to centrally manage these objects require creating, associating, and managing proxy objects to represent the contents as objects. As the number of objects continues to climb, such content-driven approaches are not scalable or achievable.

Rather than dealing with proxy objects for the contents as objects, embodiments disclosed herein take the orchestration direction with a distributed orchestrated approach that focuses on the ability to map retention values and other metadata values, but that distributes the load to the respective repositories. That is, instead of representing each one of the objects to which a retention policy is applied in a centralized repository and then applying the retention policy there, embodiments disclosed herein orchestrate the retention policy itself and not the application of the retention policy, leaving the application of the retention policy up to the individual systems. This distributed orchestrated approach, which syncs the policies but not the contents, represents a fundamental shift from the previous approaches.

For instance, in the example of FIG. 1, cloud orchestrator 150 is operable to pass a FRP to multiple repositories where the FRP is applied. More specifically, a request to push a policy to its mapped repositories is received by compliance services 120 from FC APP 100. The request is communicated by compliance services 120 to off-cloud orchestrator 150 through a tunnel service (which can be provided by tunnel server 140 shown in FIG. 1). In response, off-cloud orchestrator 150 is operable to push the policy to the mapped repositories (through its repository-specific connectors). Cloud orchestrator 170 performs in a similar way for each connected repository to push data down and/or update policies.

In some embodiments, each orchestrator functionally provides a plurality of features. For instance, an orchestrator can have multiple instances, so that no one system is bound to a single-engine running in the cloud. In some embodiments, an instance of off-cloud orchestrator 150 can target a particular system. As a non-limiting example, a controller may have a first repository of a first repository type with 4 billion objects and a second repository of a second repository type with one million objects. Two instances of off-cloud orchestrator 150 can target the first and second repositories of different repository types. This has a technical effect of allowing a federated compliance system that implements architecture 100 to scale up to service the first repository with 4 billion objects as well as to scale down to service the smaller second repository with one million objects.

An orchestrator can also allow the federated compliance system to separate the authentication layers, so that it never stores privileged keys and certificates up in the cloud for controlled on-prem repositories. This aspect can be really critical for compliance reasons, particularly for highly regulated industries such as banking, pharma, health care, and so on. That is, even though the federated compliance system has on-prem components (e.g., instances of off-cloud orchestrator 150), no privileged, sensitive, or high risk data such as personal data is stored in the cloud. Similarly, instances of the cloud orchestrator can be configured to target cloud-based storage systems such as those shown in FIG. 1. However, the instances are isolated and can scale up without impacting other engines that may be run against smaller systems in the clouds.

In some embodiments, the cloud orchestrator can be a direct API connector or connectors into the different repositories that understand how to take the data from a FRP and send the applicable data from the FRP to a connected repository. The connectors of the orchestrator are repository-specific as they have different code bases in how they are connected to the different repositories. Similarly, the off-cloud orchestrator has different repository-specific connectors. For instance, REST calls can be completely different between two different repositories even if they are of the same type. Thus, each connector of an orchestrator can be configured so that the orchestrator knows how to communicate with a particular repository.

At the frontend, an administrator or authorized user can create, view, and/or update a policy through an administrator console of a cloud-based federated compliance application (e.g., FC APP 100). Setting up or declaring a new repository can entail providing the credentials, specifying a secure tunnel, identifying an orchestrator, and so on. An example of a UI of the cloud-based federated compliance application that can be used for this purpose is illustrated in FIGS. 4A-4B.

The user-provided information is sent (e.g., by FC APP 100) to compliance services where mapping of the policy and disparate repositories takes place and where a federated retention policy is created. Once a repository is set up, it is available to be added to a federated retention policy or holds as a target repository. Once added, the user can view (e.g., through FC APP 100) information about the repository along with any repositories mapped to the same federated retention policy. The cloud-based federated compliance application provides a centralized UI (also referred to as a dashboard) for this purpose, an example of which is illustrated in FIGS. 5A-5D.

As discussed above, a federated retention policy is stored in the federated space (e.g., in a database running in the cloud). Storage in that database can be done through a shared service that is available to microservices provided by the hybrid platform described above. An example of a hybrid platform with microservices is shown in FIG. 6.

Unlike prior content-driven approaches, this database stores metadata (attributes) and not content objects. In some embodiments, the database can be a SQL database storing multiple metadata tables structured for the types of attributes shown in FIG. 2. While the hybrid platform can provide a service that stores content, the distributed federated approach described above does not store or process any content.

Also, as discussed above, the federated retention policy is synced to, or pull from, through a cloud orchestrator and/or an off-cloud orchestrator. The cloud orchestrator and/or an off-cloud orchestrator, in turn, will push the federated retention policy to respectively connected repositories that are mapped to the federated retention policy.

A difficulty in RM is that many end users are unfamiliar with RM requirements. In reality, disparate RM systems tend to store huge amounts of data for years, possibly including sensitive data, such as social security numbers (SSNs), PII, etc., and/or high risk data, such credit card numbers or any information meeting the Payment Card Industry Data Security Standard (PCI DSS), etc. To this end, what is needed is a RM tool that can run at the federated level connecting into the repositories and that can provide the analytics to crawl, classify, validate, and/or move the data for retention compliance and/or policy enforcement reasons.

In some embodiments, architecture 100 can further include a cloud-based RM tool (which, in some embodiments, can be implemented as a microservice such as an audit service, a policy enforcement service, etc.) that is accessible through the cloud-based federated compliance application described above and that can programmatically identify, validate, and take corrective actions on content in many disparate repositories in accordance with data governance policies.

In some embodiments, the cloud-based RM tool is operable to examine the contents of documents, identify data of interest (e.g., PII, SSN, credit card number, etc.), and flag the data of interest. The cloud-based RM tool can have a rules extension such that, if the content is flagged for, for instance, PCI or high risk PII, and the content currently resides in a File Share, a rule can trigger a move of that content from the File Share to a more trusted repository. Different rules can be set up to provide different corrective protection actions, for instance, moving certain data to an archive, moving certain data from an external repository provided by a third party to an internal ECM repository that is owned and operated by a controller, and so on. Where appropriate, once the content is moved to the internal ECM repository, a federated retention policy that is mapped to the ECM repository can then be pushed to the ECM repository using the cloud-based RM tool and applied to the content by the ECM repository.

As illustrated in FIG. 6, in some embodiments, movement of the content can be orchestrated centrally through the cloud-based federated compliance application and accomplished using off-cloud orchestrators communicatively connected to the external repository and to the ECM repository. In this way, storage, movement, and retention compliance of the content can be centrally controlled and managed across multiple disparate repositories. A benefit here is that the cloud-based RM tool can automatically drive the corrective action or apply the appropriate retention to reduce risk and ensure compliance with various data protection laws and regulations such as the EU GDPR, HIPPA, PCI DSS, etc. Further, because it can eliminate the need for humans to have to sift through millions upon millions of documents and make an educated guess that is often error-prone, it also increases data accuracy and processing speed and efficiency while reducing processing time.

In some embodiments, the cloud-based RM tool can leverage artificial intelligence (AI) to drive retention decisions based on applicable rules (e.g., as set forth by the EU GDPR, HIPPA, banking laws, PCI DSS, etc.). These decisions can pertain to crawling, analyzing, identifying, moving, and/or applying appropriate retention policies to cloud and/or off-cloud repositories for RM purposes.

As a non-limiting example, a records manager can utilize the cloud-based RM tool to first identify all the content in a connected repository that is outside of the scope (i.e., obsolete data) and delete or otherwise remove the obsolete data. An example of obsolete data can be a document that is 20 years old. Such a document is considered obsolete could be because the retention period is 10 years across the board for the connected repository. Thus, for efficiency, the first crawl is typically finding anything over the longest retention requirement and drive an automatic deletion. This initial culling can be based on top-level attributes such as creation, location, size, last access, etc. and can remove all the obsolete data from the connected repository and eliminate the need to spend compute unnecessarily deeply analyzing outdated data. This action can have a tremendous value to the entity to which the repository belong.

Once the repository is culled and the obsolete data deleted, the cloud-based RM tool is operable to identify data of interest (e.g., SSN, PII, etc.) in the content. In some embodiments, this is referred to as a "deep crawl" as it can entail programmatically examining the contents stored in the repository (as opposed to checking the age of each content object, for instance). In some embodiments, a deep crawler can be configured to identify the data of interest. A classifier or classification service can be utilized to classify the data of interest.

In this way, the records manager can instruct the cloud-based RM tool to perform multiple levels of crawl, including an initial culling to eliminate as much out-of-scope data as possible and a deep crawling to read the content and apply full text analytics methods such that every single read is interpreted and is run through analytic algorithms to do classification based on, for instance, patterning. For example, an analytic algorithm may take a string that is a candidate for a credit card number and determine a probability, based on a statistically analysis of historical samples, that it indeed is a credit card number. Such analytics can be done at the orchestration layer (e.g., at an off-cloud orchestrator) and the result reports can be passed up to the cloud layer (e.g., the cloud-based RM tool). However, the actual metadata is kept at the orchestration layer and only the display data that is passed up to the cloud. Accordingly, privileged information is not ever stored at the cloud layer.

Depending upon whether a piece of content contains the data of interest and what classification level at which the piece of content is classified, a move action can be triggered to move the piece of content to a more secure repository. As part of this move, a mapping around metadata between the systems can be performed. For instance, moving a document from a source system to a target system, a schema mapping between the source and target systems can be performed so that the document can be correctly stored in the target system with the appropriate attributes in data fields required by the target system. To this end, a federated retention policy mapper (e.g., one that is similar to federated retention policy mapper 250 described above) can be utilized to map the attributes.

In embodiments described above, federated retention policy mapper 250 is operable to map attributes from disparate systems into a federated retention policy. Here, the federated retention policy mapper is operable to perform the reverse mapping (i.e., mapping attributes of a federated retention policy to a particular repository). Additionally, the federated retention policy mapper is operable to map content objects for purposes not limited to RM, for instance, such as capturing content into multiple repositories.

In some embodiments, tagging can be included as part of the metadata mapping. For instance, a document can be tagged as PII-reactive. Once the content is moved (e.g., to a more secure, compliance repository), a system managing the compliance repository can have the ability to detect such tags and associate the appropriate retention policy or retention policies. Through a federated system implementing architecture 100 described above, the retention policy or retention policies would also become federated compliant.

As a non-limiting example, a document can be tagged as a human resources (HR) document type. A system managing the compliance repository where the document is stored can determine whether the document is a résumé. If so, it can associate a résumé retention policy with the document. Similarly, rules for high risk PII can be put in place so that documents tagged with PII would be automatically associated with a PII retention policy.

A move rule can be triggered by a classification type (e.g., high risk data, medium risk data, low risk data, etc.), resulting in some data being stored in the cloud and some stored off-cloud, for instance, in an on-prem repository behind an entity's firewall. For example, high risk data could be mandated to stay in an on-prem repository, while medium risk data may be stored in a private instance of a repository type in the cloud.

A rule can be configured through the compliance services and pushed down to an off-cloud orchestrator which executes an action dictated by the rule. This is another functionality of the orchestrator. In this way, processing can be done at an off-cloud location, but the configuration and management of the rules can be done at a central point in the cloud through the cloud-based RM tool.

In this way, a records manager or authorized user can utilize the cloud-based RM tool to audit distributed external systems, crawl the data, clean up the data, deep crawl the data, classify the data, and, if classified at a certain level, move the data to a protected space (i.e., a target system), with enough information (e.g., metadata) for the target system to be able to classify and associate the right retention policy to it.

In some embodiments, the cloud-based RM tool can be implemented as a SaaS tool that can be readily deployed and can handle very high volumes of service requests in a timely manner. If the SaaS tool is utilized to crawl a controlled system (e.g., a highly protected system such as a banking system, hospital system, etc.), not all of the data stored therein can be moved up to the cloud. Thus, the crawlers would be distributed and only the display data is sent up to the cloud.

More specifically, in some embodiments, all of the crawling and all of the metadata, especially for the off-cloud locations, would be kept on the off-cloud locations and only the interfaces would be extended up to the cloud through the SaaS tool. In this way, the user experience (UX) can be very SaaS-centric, while the high risk or sensitive data remains on the off-cloud locations and is not extended up to the SaaS instance. This technical effect is driven by compliance and governance such that high risk or sensitive data remains in the controlled system and is not moved to the cloud, even though compliance thereof is federated and centralized through a cloud-based SaaS tool. Another technical effect is that heavy compute in the cloud is eliminated and offloaded into data centers or private instances (e.g., data centers or private instances owned and operated by a controller). This has a benefit of lowering operation costs for a processor or an operator of the SaaS tool.

Figure 7:
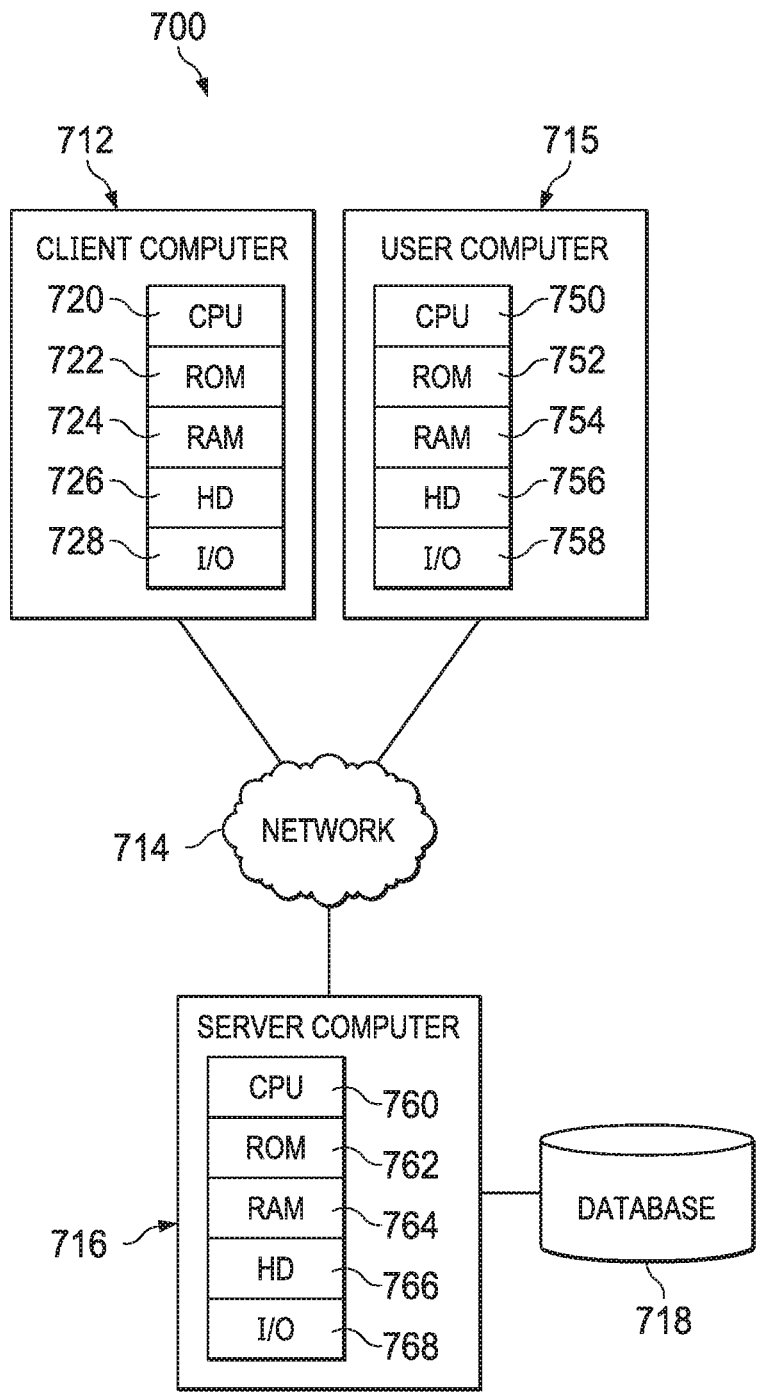
FIG. 7 depicts a diagrammatic representation of a distributed network computing environment where embodiments disclosed can be implemented.

FIG. 7 depicts a diagrammatic representation of a distributed network computing environment where embodiments disclosed can be implemented. In the example illustrated, network computing environment 700 includes network 714 that can be bi-directionally coupled to computer 712, computer 715, and computer 716. Computer 716 can be bi-directionally coupled to data store 718. Network 714 may represent a combination of wired and wireless networks that network computing environment 700 may utilize for various types of network communications known to those skilled in the art.

For the purpose of illustration, a single system is shown for each of computer 712, computer 715, and computer 716. However, with each of computer 712, computer 715, and computer 716, a plurality of computers (not shown) may be interconnected to each other over network 714. For example, a plurality of computers 712 and a plurality of computers 715 may be coupled to network 714. Computers 712 may include data processing systems for communicating with computer 716. Computers 715 may include data processing systems for individuals whose jobs may require them to configure services used by computers 712 in network computing environment 700.

Computer 712 can include central processing unit ("CPU") 720, read-only memory ("ROM") 722, random access memory ("RAM") 724, hard drive ("HD") or storage memory 726, and input/output device(s) ("I/O") 728. I/O 729 can include a keyboard, monitor, printer, electronic pointing device (e.g., mouse, trackball, stylus, etc.), or the like. Computer 712 can include a desktop computer, a laptop computer, a personal digital assistant, a cellular phone, or nearly any device capable of communicating over a network. Computer 715 may be similar to computer 712 and can comprise CPU 750, ROM 752, RAM 754, HD 756, and I/O 758.

Likewise, computer 716 may include CPU 760, ROM 762, RAM 764, HD 766, and I/O 768. Computer 716 may include one or more backend systems configured for providing a variety of services to computers 712 over network 714. Data store 718 can provide a centralized or common storage for these services. Many other alternative implementations are possible and known to skilled artisans. Thus, FIG. 7 is meant to be a non-limiting example.

Each of the computers shown in the non-limiting example of FIG. 7 can have more than one CPU, ROM, RAM, HD, I/O, or other hardware components. For the sake of brevity, each computer is illustrated as having one of each of the hardware components, even if more than one is used. Each of computers 712, 715, and 716 is an example of a data processing system. ROM 722, 752, and 762; RAM 724, 754, and 764; HD 726, 756, and 766; and data store 718 can include media that can be read by CPU 720, 750, or 760. Therefore, these types of memories include non-transitory computer-readable storage media. These memories can be internal or external to computers 712, 715, or 716.

Portions of the methods described herein may be implemented in suitable software code that may reside within ROM 722, 752, or 762; RAM 724, 754, or 764; or HD 726, 756, or 766. In addition to those types of memories, the instructions in an embodiment disclosed herein can be contained on a data storage device with a different computer-readable storage medium, such as a hard disk. Alternatively, the instructions can be stored as software code elements on a data storage array, magnetic tape, floppy diskette, optical storage device, or other appropriate data processing system readable medium or storage device.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a local area network (LAN), wide area network (WAN), and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved by distributed or networked systems. Communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted. The scope of the disclosure should be determined by the following claims and their legal equivalents.

What is claimed is:

1. A method, comprising:
   providing, by a federated compliance system executing on a processor and having a federated retention policy mapper, a cloud-based centralized user interface on a user device;
   presenting, by the federated compliance system through the cloud-based centralized user interface, a policy of interest and representations of disparate systems that match the policy of interest, the disparate systems operating in a distributed network computing environment and employing different repository schemas;
   receiving, by the federated compliance system through the cloud-based centralized user interface, user-provided information on the policy of interest;
   determining, by the federated compliance system utilizing the user-provided information on the policy of interest, attributes associated with the policy of interest from the different repository schemas employed by the disparate systems in the distributed network computing environment;
   creating a federated retention policy by mapping, by the federated retention policy mapper using a data model, the attributes from the different repository schemas employed by the disparate systems to a common schema, wherein the mapping produces the federated retention policy;
   storing, by the federated compliance system, the federated retention policy in a federated space in the distributed network computing environment;
   passing the federated retention policy to each of the disparate systems, wherein the federated retention policy passed to a disparate system is adapted for the attributes from the repository schema employed by that disparate system based on the mapping between the attributes from the repository schema employed by that disparate system and the common schema;
   receiving an indication that a new policy has been created; and
   associating the new policy with the disparate systems, the associating including determining a set of attributes from the new policy and mapping the set of attributes to the federated retention policy.

2. The method according to claim 1, wherein the disparate systems include a plurality of cloud-based repositories and a plurality of off-cloud repositories and wherein the federated compliance system further comprises a cloud orchestrator and an off-cloud orchestrator, the method further comprising:
   syncing the federated retention policy with the plurality of cloud-based repositories through the cloud orchestrator; and
   syncing the federated retention policy with the plurality of off-cloud repositories through the off-cloud orchestrator.

3. The method according to claim 1, further comprising:
   providing the federated retention policy mapper as a compliance service, wherein the federated compliance system further comprises a retention policy service; and
   communicating, by the compliance service, the federated retention policy to the retention policy service, wherein the storing is performed by the retention policy service.

4. The method according to claim 1, wherein the determining comprises determining categories of the attributes and wherein the categories comprises:
- a category for attributes that are common in the disparate systems to which the policy of interest is applicable;
- a category for attributes that are common in a repository type;
- a category for attributes that are common across a single repository type; and
- a category for attributes that are specific to a single repository.

5. The method according to claim 1, further comprising:
- receiving, by the federated compliance system through the cloud-based centralized user interface, an indication of a change to the policy of interest; and
- automatically propagating the change to the disparate systems, the automatically propagating including modifying the federated retention policy to reflect the change and syncing the federated retention policy thus modified with the disparate systems, the syncing including mapping a data field in the common schema with a data field in a repository schema of the repository schemas.

6. The method according to claim 1, further comprising:
- determining whether a repository of the disparate systems requires a data field for indicating a phase of a multi-phase policy;
- responsive to a determination that the data field is not required by the repository, mapping the repository to a default value; and
- storing the default value at a storage location local to the federated compliance system.

7. A federated compliance system, comprising:
- a processor;
- a non-transitory computer-readable medium; and
- stored instructions translatable by the processor for:
  - providing a cloud-based centralized user interface on a user device;
  - presenting, through the cloud-based centralized user interface, a policy of interest and representations of disparate systems that match the policy of interest, the disparate systems operating in a distributed network computing environment and employing different repository schemas;
  - receiving, through the cloud-based centralized user interface, user-provided information on the policy of interest;
  - determining, utilizing the user-provided information on the policy of interest, attributes associated with the policy of interest from the different repository schemas employed by the disparate systems in the distributed network computing environment;
  - creating a federated retention policy by mapping, using a data model, the attributes from the different repository schemas employed by the disparate systems to a common schema, wherein the mapping produces the federated retention policy;
  - storing the federated retention policy in a federated space in the distributed network computing environment;
  - passing the federated retention policy to each of the disparate systems, wherein the federated retention policy passed to a disparate system is adapted for the attributes from the repository schema employed by that disparate system based on the mapping between the attributes from the repository schema employed by that disparate system and the common schema;
  - receiving an indication that a new policy has been created; and
  - associating the new policy with the disparate systems, the associating including determining a set of attributes from the new policy and mapping the set of attributes to the federated retention policy.

8. The federated compliance system of claim 7, wherein the disparate systems include a plurality of cloud-based repositories and a plurality of off-cloud repositories, wherein the federated compliance system further comprises a cloud orchestrator and an off-cloud orchestrator, wherein the stored instructions are further translatable by the processor for:
- syncing the federated retention policy with the plurality of cloud-based repositories through the cloud orchestrator; and
- syncing the federated retention policy with the plurality of off-cloud repositories through the off-cloud orchestrator.

9. The federated compliance system of claim 7, wherein the stored instructions are further translatable by the processor for:
- providing the federated retention policy mapper as a compliance service, wherein the federated compliance system further comprises a retention policy service; and
- communicating, by the compliance service, the federated retention policy to the retention policy service, wherein the storing is performed by the retention policy service.

10. The federated compliance system of claim 7, wherein the determining comprises determining categories of the attributes and wherein the categories comprises:
- a category for attributes that are common in the disparate systems to which the policy of interest is applicable;
- a category for attributes that are common in a repository type;
- a category for attributes that are common across a single repository type; and
- a category for attributes that are specific to a single repository.

11. The federated compliance system of claim 7, wherein the stored instructions are further translatable by the processor for:
- receiving, through the cloud-based centralized user interface, an indication of a change to the policy of interest; and
- automatically propagating the change to the disparate systems, the automatically propagating including modifying the federated retention policy to reflect the change and syncing the federated retention policy thus modified with the disparate systems, the syncing including mapping a data field in the common schema with a data field in a repository schema of the repository schemas.

12. The federated compliance system of claim 7, wherein the stored instructions are further translatable by the processor for:
- determining whether a repository of the disparate systems requires a data field for indicating a phase of a multi-phase policy;
- responsive to a determination that the data field is not required by the repository, mapping the repository to a default value; and
- storing the default value at a storage location local to the federated compliance system.

13. A computer program product comprising a non-transitory computer-readable medium storing instructions translatable by a processor of a federated compliance system for:
- providing a cloud-based centralized user interface on a user device;
- presenting, through the cloud-based centralized user interface, a policy of interest and representations of disparate systems that match the policy of interest, the disparate systems operating in a distributed network computing environment and employing different repository schemas;
- receiving, through the cloud-based centralized user interface, user-provided information on the policy of interest;
- determining, utilizing the user-provided information on the policy of interest, attributes associated with the policy of interest from the different repository schemas employed by the disparate systems in the distributed network computing environment;
- creating a federated retention policy by mapping, using a data model, the attributes from the different repository schemas employed by the disparate systems to a common schema, wherein the mapping produces the federated retention policy;
- storing the federated retention policy in a federated space in the distributed network computing environment;
- passing the federated retention policy to each of the disparate systems, wherein the federated retention policy passed to a disparate system is adapted for the attributes from the repository schema employed by that disparate system based on the mapping between the attributes from the repository schema employed by that disparate system and the common schema;
- receiving an indication that a new policy has been created; and
- associating the new policy with the disparate systems, the associating including determining a set of attributes from the new policy and mapping the set of attributes to the federated retention policy.

14. The computer program product of claim 13, wherein the disparate systems include a plurality of cloud-based repositories and a plurality of off-cloud repositories, wherein the federated compliance system further comprises a cloud orchestrator and an off-cloud orchestrator, wherein the instructions are further translatable by the processor for:
- syncing the federated retention policy with the plurality of cloud-based repositories through the cloud orchestrator; and
- syncing the federated retention policy with the plurality of off-cloud repositories through the off-cloud orchestrator.

15. The computer program product of claim 13, wherein the instructions are further translatable by the processor for:
- providing the federated retention policy mapper as a compliance service, wherein the federated compliance system further comprises a retention policy service; and
- communicating, by the compliance service, the federated retention policy to the retention policy service, wherein the storing is performed by the retention policy service.

16. The computer program product of claim 13, wherein the determining comprises determining categories of the attributes and wherein the categories comprises:
- a category for attributes that are common in the disparate systems to which the policy of interest is applicable;
- a category for attributes that are common in a repository type;
- a category for attributes that are common across a single repository type; and
- a category for attributes that are specific to a single repository.

17. The computer program product of claim 13, wherein the instructions are further translatable by the processor for:
- receiving, through the cloud-based centralized user interface, an indication of a change to the policy of interest; and
- automatically propagating the change to the disparate systems, the automatically propagating including modifying the federated retention policy to reflect the change and syncing the federated retention policy thus modified with the disparate systems, the syncing including mapping a data field in the common schema with a data field in a repository schema of the repository schemas.

* * * * *